Patented Oct. 8, 1929

1,730,915

UNITED STATES PATENT OFFICE

MAX BUCHNER, OF HANOVER-KLEEFELD, GERMANY, ASSIGNOR TO ALBERT FRITZ MEYERHOFER, OF ZURICH, SWITZERLAND

PROCESS FOR THE DECOMPOSITION OF COMPLEX HYDROFLUORIC SALTS

No Drawing. Application filed March 23, 1926, Serial No. 96,883, and in Germany March 24, 1925.

This invention relates to a process for decomposing complex-hydrofluoric salts by heat, for instance potassium silico fluoride, sodium silico fluoride, barium silico fluoride and corresponding complex fluorides of boron and so forth.

The decomposition by heat proceeds for instance for sodium-silico fluoride according to the equation:

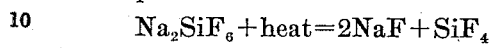
$$Na_2SiF_6 + heat = 2NaF + SiF_4$$

The complete execution of these reactions and of the equivalent reactions presented however great practical difficulties. Even strong glowing during 24 hours did not give a perfect result, so that this decomposition-reaction has hitherto not been carried out economically.

This invention has for its object to carry such decomposition out in such a manner that sintering of the complex-hydrofluoric salts or of the fragments from the same is prevented, the working being consequently carried out under conditions or at temperatures which exclude a sintering.

In this manner sodium silicofluoride and the complex-hydrofluoric salts related to the same can be separated quantitatively, for instance into sodium fluoride and silicon fluoride, care having however to be taken that the salts do not sinter or melt during the heating as the sintered state has an unfavorable action upon the decomposition-reaction.

It has been ascertained that sintering and melting happens, for instance, by too high temperature which has been thought necessary up to the present.

Sintering and melting is further caused or promoted by the presence of impurities which are capable of lowering the melting and the sintering points of the sodium silico fluoride. By sintering and melting the silicon fluoride which separates by the heat is prevented from escaping and it influences in a prejudicial manner the course of the equilibrium reaction:

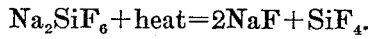
$$Na_2SiF_6 + heat = 2NaF + SiF_4.$$

The sodium fluoride, which is formed by the decomposition of the sodium silico fluoride by heat, can for instance act like an impurity, as it lowers the melting point. This melting process is evidently carried out the easier, the higher the temperature is.

The new heating regulation concerns the complex hydrofluoric salts each for itself as well as mixtures. It is valid, on the one hand, for the state of rest and, on the other hand, for the agitated state.

As the tension of the volatile fluoride formed by the decomposition of complex hydrofluoric salt, for instance of the silicon fluoride from the sodium silico fluoride, at temperatures below the sintering point, is comparatively low, the decomposition according to the invention is carried out by conducting suitable gases or gas mixtures over the material to be decomposed. This material is heated from the inside or from the outside. The complex fluorides are heated by conducting over the same suitable gases or gas mixtures, for instance air, whereby the partial pressure of the separated silicon fluoride is kept so low that a continuous, uniform separation of the same takes place.

The same result can be further obtained by carrying out the heating in a convenient arrangement in the vacuum, the volatile constituent being separated from the material to be decomposed at temperatures which are still below the sintering temperature of the said material. In this manner a thorough decomposition of the silico fluoride or of other complex fluorides is obtained.

Gases or gas mixtures, the presence of which at the decomposition reaction is advantageous, are, besides air, steam, hydrogen, flue gases, generator gas, and in general reducing or oxidizing gases.

Instead admitting the gases into the furnace they may be produced in the decomposition chamber by supplying combinations from which the desired gases are generated.

At the decomposition of, for instance the sodium silico fluoride, on a large scale considerable masses and volumes are obviously involved. Care has to be taken, that the sodium silico fluoride is heated in all its parts to the temperatures which are necessary for the decomposition at the definite corresponding pressures, or that during disintegrating the silicon fluoride or the sodium fluoride which have already been separated are withdrawn. The combinations to be decomposed, for instance the sodium silico fluoride, are therefore preferably agitated during the decomposition. The decomposition can be carried out, for instance in manufacture on a large scale, in tubular heating chambers which are moved and which are heated directly or indirectly, the material in the decomposition chambers being agitated for instance by rotation of the chamber, or the material may be agitated by being conveyed through stationary chambers, for instance stationary vertical retorts to be heated indirectly or stationary tubular furnaces, or the material to be decomposed may be conveyed by blowing into hot gases or by blowing away with hot gases and the like.

In wholesale production the tubular revolving furnace is for instance used for the decomposition of the sodium silico fluoride this furnace being heated from the inside, quantitative decomposition being thus obtained. This fact is surprising in the highest degree as the silicon fluoride formed during decomposition reacts with water. It was, therefore, supposed that a decomposition of the silicon fluoride would occur according to the equation:

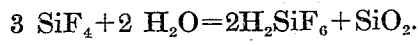

This reaction does, however, not occur, and the water does not act upon the silicon fluoride at higher temperatures under the conditions which have been stated.

The sulphurous acid contained in the generator gas or the carbonic acid produced by the combustion of generator gas are, for instance, without effect upon the sodium silico fluoride as well as upon the material to be decomposed, upon the components of the same and upon its products of decomposition.

Upon the decomposition of the sodium silico fluoride, in the revolving tubular furnace the gas quantities required for the reducing of partial pressure are supplied automatically to the gases of combustion. They serve further for regulating the temperature of the flame so that impurities, which unavoidably get into the furnace, have not the same influence as if the material to be decomposed were heated in the state of rest. The reason is probably that in the agitated or moving material heat cannot accumulate so that there is not any excessive heating.

One of the essential forms of carrying out the new process consists in conducting the material to be decomposed through a heated chamber e. g. continuous working. This also includes the conveying of the complex hydrofluoric salt through a reverbratory furnace with the aid of conveying means.

The addition of substances, which generate suitable gases, has already been mentioned. Other components and additional substances might however also be introduced into the furnace. The presence of fluor-spar for instance is favorable for the decomposition of the complex fluorides.

The waste gases produced, which contain at least a certain heat, may be further utilized for heating purposes, for inner or outer heating, or for the carrying through of reactions, which supply the compounds necessary for the decomposition of the complex fluorides, for instance lead to said complex fluorides themselves.

I claim:—

1. A process for the decomposition of complex hydrofluoric salts, consisting in carrying out the decomposition by heat under such conditions which exclude a sintering, and in conducting at the same time gas over the material to be decomposed.

2. A process for the decomposition of complex hydrofluoric salts, consisting in carrying out the decomposition by heat under such conditions which exclude a sintering, and in conducting at the same time gas mixture over the material to be decomposed.

3. A process for the decomposition of complex hydrofluoric salts, consisting in carrying out the decomposition by heat under such conditions which exclude a sintering, and in conducting at the same time air over the material to be decomposed.

4. A process for the decomposition of complex hydrofluoric salts, consisting in carrying out the decomposition by heat under such conditions which exclude a sintering, and in conducting at the same time mixtures of air and gases from combustion over the material to be decomposed.

5. A process for the decomposition of complex hydrofluoric salts, consisting in heating complex hydrofluoric salts with addition of combinations, which are capable of forming gases during heating, and under such conditions that no sintering takes place.

6. A process for the decomposition of complex hydrofluoric salts, consisting in heating complex hydrofluoric salts at a pressure lower than the atmospheric pressure, and under such conditions that no sintering takes place.

7. A process for the decomposition of complex hydrofluoric salts, consisting in heating complex hydrofluoric salts in a chamber contained rarefied gas and below the sintering point.

8. A process for the decomposition of complex hydrofluoric salts, consisting in maintaining the complex hydrofluoric salts in movement during the decomposition while heating them below their sintering and melting temperature, and in conducting at the same time gases over the material.

9. A process for the decomposition of complex hydrofluoric salts, consisting in maintaining the complex hydrofluoric salts in movement during the decomposition which takes place below the sintering- or melting temperature, and in a rarefied atmosphere.

10. A process for the decomposition of complex hydrofluoric salts, consisting in carrying out the heating in furnace plants heated from the inside at temperature below the sintering point and in conducting at the same time gas over the material.

11. A process for the decomposition of complex hydrofluoric salts, consisting in carrying out the disintegration of the complex hydrofluoric salts in heating chambers, in conveying the material to be disintegrated through the said chambers, in heating said chambers from the inside so that sintering cannot occur, and eventually in conducting gas through said chambers.

12. A process for the decomposition of complex hydrofluoric salts, consisting in atomizing the complex hydrofluoric salts in a heated chamber while avoiding sintering and introducing gas during the decomposition.

13. A process for the decomposition of complex hydrofluoric salts, consisting in carrying out the decomposition of the complex hydrofluoric salts at a temperature below the sintering- and melting point of said salts, and in conducting gases over the material to be decomposed in order to lower the partial pressure of the liberated fluoride of the complex-forming element and in order to facilitate the escaping of the gas.

14. A process for the decomposition of complex hydrofluoric salts, consisting in carrying out the decomposition of the complex hydrofluoric salts in mixture with other components at a temperature below the sintering- and melting point of said salts, and in conducting gases over the material to be decomposed in order to lower the partial pressure of the liberated fluoride of the complex-forming element and in order to facilitate the escaping of the gas.

15. A process for the decomposition of complex hydrofluoric salts, consisting in carrying out the decomposition of the complex hydrofluoric salts in mixture with fluorspar at a temperature below the sintering- and melting point of said salts, and in conducting gases over the material to be decomposed in order to lower the partial pressure of the liberated fluoride of the complex-forming element and in order to facilitate the escaping of the gas.

16. A process for the decomposition of complex hydrofluoric salts, consisting in carrying out the decomposition of the complex hydrofluoric salts in mixture with other components at a temperature below the sintering- and melting point of said salts, and in conducting gases over the material to be decomposed in order to lower the partial pressure of the liberated fluoride of the complex-forming element and in order to facilitate the escaping of the gas, and in re-utilizing the waste gases which are generated, for heating purposes and for carrying out reactions which supply the combinations required for the decomposition proper.

17. A process for the decomposition of complex hydrofluoric salts, consisting in carrying out the decomposition of the complex hydrofluoric salts, eventually with additions, at a temperature below the sintering- and melting point of said salts, in agitating said salts during the decomposition process, in conducting gases over the material to be decomposed in order to lower the partial pressure of the liberated fluoride of the complex-forming element and in order to faciltiate the escaping of the gas, and in heating from the inside the material to be disintegrated.

18. A process for the decomposition of complex hydrofluoric salts, consisting in carrying out the decomposition of the complex hydrofluoric salts, eventually with additions, at a temperature below the sintering- and melting point of said salts, in agitating said salts during the decomposition process, and in maintaining in the heating chamber a rarefied atmosphere.

19. A process for the decomposition of complex hydrofluoric salts, consisting in carrying out the decomposition of the complex hydrofluoric salts, eventually with additions, at a temperature below the sintering- and melting point of said salts, in agitating said salts during the decomposition process, in conducting rarefied gases over the material to be disintegrated in order to lower the partial pressure of the liberated fluoride of the complex-forming element and in order to facilitate the escaping of the gas.

20. A process for the decomposition of complex hydrofluoric salts, which comprises blowing the complex hydrofluoric acid salts with hot gases into a chamber serving for the decomposition, while avoiding sintering.

In testimony whereof I have affixed my signature.

Dr. MAX BUCHNER.